United States Patent
Zhao et al.

(10) Patent No.: US 10,234,718 B2
(45) Date of Patent: Mar. 19, 2019

(54) DISPLAY DEVICE AND VIRTUAL REALITY GLASSES

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wenqing Zhao, Beijing (CN); Xue Dong, Beijing (CN); Xiaochuan Chen, Beijing (CN); Jian Gao, Beijing (CN); Qian Wang, Beijing (CN); Pengcheng Lu, Beijing (CN); Ming Yang, Beijing (CN); Rui Xu, Beijing (CN); Lei Wang, Beijing (CN); Xiaochen Niu, Beijing (CN)

(73) Assignees: BOE TECHNOLOGY GROUP CO., LTD., Beijing (CN); BEIJING BOE OPTOELECTRONICS TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 15/525,931

(22) PCT Filed: Oct. 21, 2016

(86) PCT No.: PCT/CN2016/102865
§ 371 (c)(1),
(2) Date: May 10, 2017

(87) PCT Pub. No.: WO2017/118157
PCT Pub. Date: Jul. 13, 2017

(65) Prior Publication Data
US 2018/0081239 A1   Mar. 22, 2018

(30) Foreign Application Priority Data

Jan. 8, 2016 (CN) .......................... 2016 1 0011823

(51) Int. Cl.
*G02B 27/01* (2006.01)
*G02F 1/136* (2006.01)
*G02F 1/1335* (2006.01)

(52) U.S. Cl.
CPC ....... *G02F 1/133528* (2013.01); *G02B 27/01* (2013.01); *G02B 27/017* (2013.01);
(Continued)

(58) Field of Classification Search
None
See application file for complete search history.

(56) References Cited

U.S. PATENT DOCUMENTS 5,046,827 A * 9/1991 Frost ..................... G02B 5/1842
349/109
9,456,744 B2 * 10/2016 Popovich ........... G02B 27/0093
(Continued)

FOREIGN PATENT DOCUMENTS

CN   103348278 A   10/2013
CN   103885582 A   6/2014
(Continued)

OTHER PUBLICATIONS

International Search Report and Written Opinion in PCT/CN2016/102865 dated Jan. 20, 2017, with English translation.

*Primary Examiner* — Ryan Crockett
(74) *Attorney, Agent, or Firm* — Womble Bond Dickinson (US) LLP

(57) ABSTRACT

Embodiments of the present disclosure provide a display device and virtual reality glasses. The display device comprises an array substrate, which comprises a base substrate, a plurality of sub-pixels arranged on the base substrate, and a grating arranged on the base substrate. The grating comprises a plurality of sub-gratings having different structures, and each sub-grating comprises an adjusting part for adjust- (Continued)

ing propagation direction of light rays, so that light rays exiting from the adjusting part converge to a predetermined spatial position. The array substrate further comprises a plurality of preset areas, and the plurality of sub-gratings correspond to sub-pixels located in different preset areas respectively. The display device further comprises a light source disposed beside the base substrate. The light rays emitted from the light source are parallel light. The light rays are totally reflected in the array substrate except in regions where the adjusting parts of sub-gratings are located.

18 Claims, 5 Drawing Sheets

(52) U.S. Cl.
CPC ........ *G02F 1/136* (2013.01); *G02F 1/133504* (2013.01); *G02F 1/133553* (2013.01); *G02F 1/133555* (2013.01); *G02B 2027/0178* (2013.01); *G02F 2001/133565* (2013.01)

(56) References Cited

U.S. PATENT DOCUMENTS

| | | | |
|---|---|---|---|
| 9,804,389 B2* | 10/2017 | Popovich | G02B 27/0093 |
| 2007/0008467 A1* | 1/2007 | Tomaru | G02B 26/001 349/114 |
| 2012/0154920 A1* | 6/2012 | Harrison | G02B 3/0056 359/619 |
| 2013/0285885 A1 | 10/2013 | Nowatzyk et al. | |
| 2014/0043320 A1 | 2/2014 | Tosaya et al. | |
| 2014/0049733 A1* | 2/2014 | Suzuki | G02F 1/133514 349/96 |
| 2014/0168783 A1 | 6/2014 | Luebke et al. | |
| 2017/0357101 A1* | 12/2017 | Tervo | G03B 21/2033 |

FOREIGN PATENT DOCUMENTS

| | | |
|---|---|---|
| CN | 104246578 A | 12/2014 |
| CN | 105093532 A | 11/2015 |
| CN | 205281025 U | 6/2016 |
| WO | WO 2010125337 A2 * 11/2010 | ............. G02B 27/01 |

\* cited by examiner

DISPLAY DEVICE AND VIRTUAL REALITY GLASSES

RELATED APPLICATIONS

The present application is the U.S. national phase entry of PCT/CN2016/102865, with an international filling date of Oct. 21, 2016, which claims benefit to the Chinese patent application No. 201610011823.3 filed on Jan. 8, 2016, the entire disclosure of which is hereby incorporated by reference in its entirety.

FIELD

The present disclosure relates to the technical field of display, and particularly to a display device and virtual reality glasses.

BACKGROUND

A pair of virtual reality glasses is a virtual reality display device. Wearing the virtual reality glasses may occlude a user's vision from outside world and guide the user to generate a feeling as being in a virtual environment. Hence, the virtual reality glasses can bring new experience to a user and attract increasing attention.

In prior art, virtual reality glasses comprise two display devices that are arranged to correspond to a left eye and a right eye respectively. Each display device comprises a plurality of sub-pixels arranged in an array. The Inventor of the present disclosure finds that light rays emitted from sub-pixels propagate in different directions, as shown in FIG. 1, and then only a small portion of light rays emitted from sub-pixels can reach a user's eyes, causing low utilization of light rays.

SUMMARY

Embodiments of the present disclosure provide a display device and virtual reality glasses, which are used to improve the amount of light rays exiting from sub-pixels in the display device into predetermined spatial position(s) such as a user's eyes, thereby increasing light ray utilization of the display device.

To this end, embodiments of the present disclosure provide a display device that employs the following technical solutions.

The display device comprises an array substrate. The array substrate comprises a base substrate, a plurality of sub-pixels arranged on the base substrate, and a grating arranged on the base substrate. The grating comprises a plurality of sub-gratings having different structures. Each sub-grating comprises an adjusting part for adjusting propagation direction of light rays, and light rays exiting from the adjusting part converge to a predetermined spatial position. The array substrate further comprises a plurality of preset areas, and the plurality of sub-gratings respectively correspond to sub-pixels located in different preset areas. The display device further comprises a light source disposed beside the base substrate. The light rays emitted from the light source are parallel light, and the light rays are totally reflected in the array substrate except in regions where adjusting parts of sub-gratings are located.

The display device according to embodiments of the present disclosure has the aforesaid structure. Since sub-gratings having different structures correspond to sub-pixels located in different preset areas, and light rays exiting from adjusting parts of the sub-gratings having different structures all converge towards predetermined spatial position(s) (e.g., human eyes) located in front of the display device, light rays emitted from sub-pixels all converge towards the predetermined spatial position(s) located in front of the display device after passing through respective sub-gratings. This effectively increases the amount of light rays emitted from the sub-pixels into predetermined spatial position(s) (e.g., human eyes), thereby effectively improving light ray utilization of the display device.

Optionally, an area where one sub-pixel is located is a preset area, and one sub-pixel corresponds to a sub-grating or sub-gratings with one structure.

Optionally, all of the sub-gratings are slit grating, and the adjusting parts of the sub-gratings are slits included in the sub-gratings.

Optionally, incident angle of light rays incident into all of the sub-gratings is $\alpha$, and $\alpha$ is an angle between the light rays emitted from the light source and a plane where the base substrate is located. The sub-gratings comprise first sub-grating(s) corresponding to sub-pixel(s) located on a center of the array substrate, and second sub-grating corresponding to other sub-pixels. Exit angle of light rays exiting from the first sub-grating is $\theta_1$. The exit angle $\theta_1$ is an angle between the light rays exiting from the first sub-grating and a plane where the grating is located, and $\theta_1 = 90°$.

Optionally, extension direction of slits included in the first sub-grating is parallel to a side surface of the base substrate that is adjacent to the light source. Grating constant of the first sub-grating is $d_1$, $$d_1 = \frac{\lambda_1}{\cos\alpha},$$

wherein $\lambda_1$ is wavelength of light rays in a first color, and the first color is a color to be displayed by the sub-pixel(s) corresponding to the first sub-grating.

Optionally, all of the second sub-gratings are symmetrically distributed about a center, and the center of symmetry is the center of the array substrate.

Optionally, a direction outwards from the first sub-grating and perpendicularly pointing towards the side surface of the base substrate that is adjacent to the light source is a predetermined direction. Exit angle of light rays exiting from a second sub-grating distributed in the predetermined direction is $\theta_2$, $$\theta_2 = \arctan\frac{D}{L},$$

wherein D is a vertical distance between the predetermined spatial position and the plane where the second sub-grating is located, and L is a distance between the second sub-grating and the first sub-grating in the predetermined direction.

Optionally, grating constant of the second sub-gratings is $d_2$, $$\theta_2 = \arctan\frac{D}{L},$$

wherein $\lambda_2$ is wavelength of light rays in a second color, and the second color is a color to be displayed by the sub-pixel corresponding to the second sub-grating. The above equation takes a plus sign if the light rays incident into the second sub-grating and the light rays exiting from the second sub-grating are located on the same side of the second sub-grating. The above equation takes a minus sign if the light rays incident into the second sub-grating and the light rays exiting from the second sub-grating are located on different sides of the second sub-grating.

Optionally, the valid number and width of slits included in respective second sub-gratings distributed in the predetermined direction are the same as the first sub-grating, and the slits included in respective second sub-gratings have an inclination angle $\beta$, and $$\beta = \arccos \frac{\lambda_1 \left( \cos\alpha \pm \dfrac{L}{\sqrt{D^2 + L^2}} \right)}{\lambda_2 \cos\alpha}.$$

Optionally, light intensity of light rays exiting from a sub-grating is I, $$I = I_0 \frac{\sin^2\delta}{\delta^2} \cdot \frac{\sin^2 N \cdot v}{\sin^2 v},$$

wherein $$\delta = \frac{\pi a \sin\theta}{\lambda} \text{ and } v = \frac{\pi d \sin\theta}{\lambda},$$

wherein $\lambda$ is wavelength of a color displayed by a sub-pixel corresponding to the sub-grating, $\alpha$ is width of slits included in the sub-grating, d is grating constant of the sub-grating, N is the valid number of slits included in the sub-gratings, $\theta$ is exit angle of the light rays exiting from the sub-grating, and $I_0$ is intensity of light rays incident into the sub-grating and having wavelength $\lambda$.

Optionally, the sub-gratings comprise first sub-grating(s) corresponding to sub-pixel(s) located on a center of the array substrate, and second sub-gratings corresponding to other sub-pixels. The first sub-grating is a slit grating, and the adjusting part of the first sub-grating is slits included in the first sub-grating. All of the second sub-gratings are blazed grating, and the adjusting parts of the second sub-gratings are respectively groove surfaces of the second sub-gratings.

Optionally, extension direction of the slits included in the first sub-grating is parallel to a side surface of the base substrate that is adjacent to the light source. Grating constant of the first sub-grating is $d_1$, $$d_1 = \frac{\lambda_1}{\cos\alpha},$$

wherein $\lambda_1$ is wavelength of light rays in a first color, and the first color is a color to be displayed by a sub-pixel corresponding to the first sub-grating.

Optionally, a direction outwards from the first sub-grating and perpendicularly pointing towards the side surface of the base substrate that is adjacent to the light source is a predetermined direction. Blazing angle of a second sub-grating distributed in the predetermined direction is $\gamma$, $$\gamma = \arctan \frac{L}{D}.$$

Grating constant of the second sub-gratings distributed in the predetermined direction is $d_2$, $$d_2 = \frac{\lambda_2 \sqrt{L^2 + D^2}}{2L},$$

wherein $\lambda_2$ is wavelength of light rays in a second color, the second color is a color to be displayed by a sub-pixel corresponding to the second sub-grating, D is a vertical distance between the predetermined spatial position and the plane where the grating is located, and L is a distance between the second sub-grating and the first sub-grating in the predetermined direction.

Optionally, all of the sub-gratings are diffractive gratings with surfaces being provided with bar-shaped protrusions and bar-shaped grooves.

Optionally, an area where one sub-pixel is located comprises a plurality of preset areas. An individual sub-pixel corresponds to a plurality of sub-gratings having different structures so that light rays exiting from the plurality of sub-gratings having different structures and corresponding to the individual pixel cover a certain range.

Optionally, the plurality of sub-gratings having different structures and corresponding to the individual pixel are all slit grating. The valid number and width of slits included in respective sub-gratings are the same, and the slits included in the sub-gratings having different structures have different inclination angles $\beta$. The inclination angles $\beta$ are angles between extension directions of slits in respective sub-gratings and the side surface of the base substrate that is adjacent to the light source.

Optionally, a maximum difference between the inclination angles $\beta$ of the slits included in the plurality of sub-gratings having different structures and corresponding to an individual pixel is 30°-40°.

Optionally, an area where adjacent multiple sub-pixels are located is a preset area, and the adjacent multiple sub-pixels located in the same preset area correspond to sub-grating(s) with one structure.

Optionally, the display device further comprises a color film substrate arranged opposite to the array substrate, and a liquid crystal molecularly layer arranged between the array substrate and the color film substrate. The light rays emitted from the light source are linearly polarized light, and only a side of the color film substrate facing away from the array substrate is provided with an upper polarizer; or, the light rays emitted from the light source are natural light, and in addition to the upper polarizer disposed on the side of the color film substrate facing away from the array substrate, the display device further comprises a lower polarizer which is arranged between the light source and the side surface of the base substrate, or arranged on the grating.

Optionally, embodiments of the present disclosure further provide virtual reality glasses, which employ the following technical solution.

The virtual reality glasses comprise housing and two aforesaid display devices located in the housing, wherein the predetermined spatial position of one of the display devices corresponds to a user's left eye, and the predetermined spatial position of the other of the display devices corresponds to the user's right eye.

Since the virtual reality glasses provided by the embodiment of the present disclosure comprise the aforesaid display devices, the virtual reality glasses have the same advantageous effects as the aforesaid display devices, which will not be discussed in details herein.

BRIEF DESCRIPTION OF DRAWINGS

To make technical solutions in embodiments of the present disclosure or technical solutions in prior art more apparent, figures used in description of the embodiments will be introduced briefly. Obviously, the figures in the following description are only some of embodiments of the present invention. Those having ordinary skill in the art would appreciate that other figures may be obtained according to these figures without creative efforts.

DETAILED DESCRIPTION

Technical solutions in embodiments of the present disclosure will be described clearly and completely in conjunction with figures in the embodiments of the present disclosure. Obviously, the embodiments described herein are some of embodiments of the present disclosure, but not all embodiments. All other embodiments obtained by those having ordinary skill in the art based on the embodiments in the present disclosure without creative efforts fall within the protection scope of the present disclosure.

Figure 1:
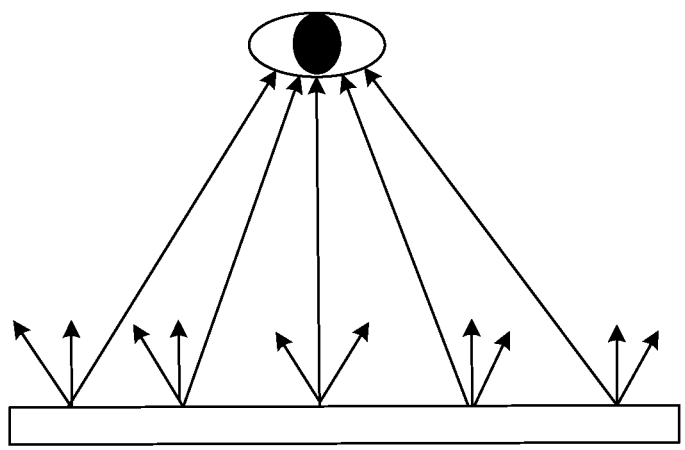
FIG. 1 is a diagram showing propagation paths of light rays emitted from sub-pixels in a display device in prior art.
Figure 2:
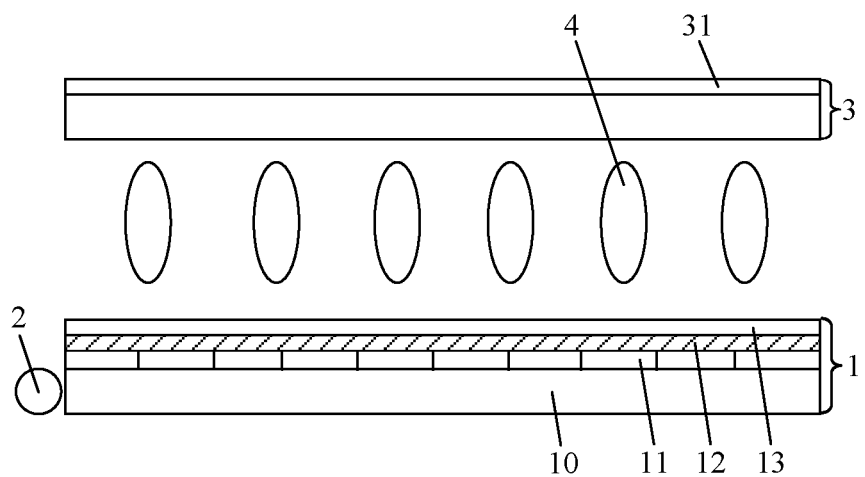
FIG. 2 is a sectional view of a display device according to an embodiment of the present disclosure.
Figure 3:
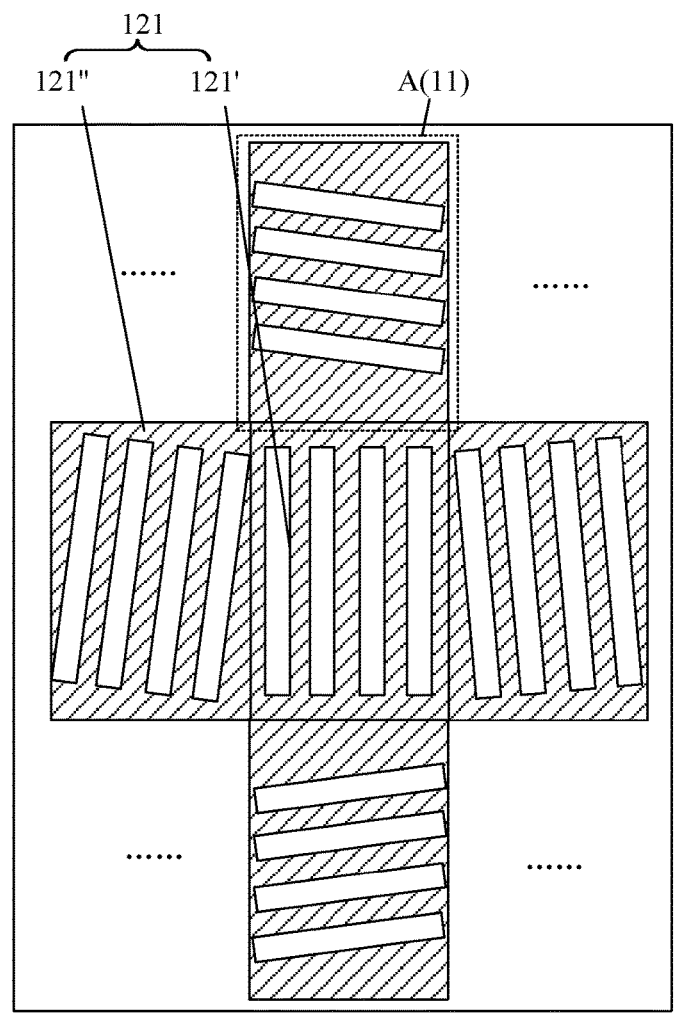
FIG. 3 is a first top view of an array substrate in an embodiment of the present disclosure.
Figure 4:
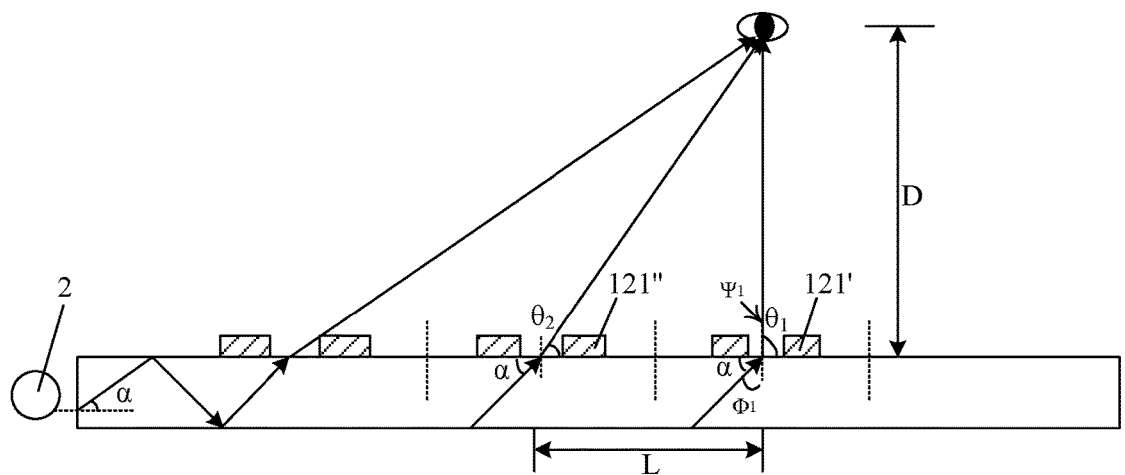
FIG. 4 is a first sectional view of an array substrate in an embodiment of the present disclosure.

Embodiments of the present invention provide a display device. As shown in FIG. 2, FIG. 3 and FIG. 4, the display device comprises an array substrate 1, which comprises a base substrate 10, and a plurality of sub-pixels 11 arranged on the base substrate 10. The array substrate 1 further comprises a grating 12 arranged on the base substrate 10. The grating 12 comprises a plurality of sub-gratings 121, which may have different structures. Each of sub-gratings 121 comprises an adjusting part for adjusting propagation direction of light rays, so that light rays exiting from the adjusting part converge to a predetermined spatial position. The array substrate 1 further comprises a plurality of preset areas A, and the plurality of sub-gratings 121 respectively correspond to sub-pixels 11 located in different preset areas A. The display device further comprises a light source 2, which may be disposed beside the base substrate 10. Light rays emitted from the light source 2 are parallel light. The light rays are totally reflected in the array substrate 1 except in regions where adjusting parts of sub-gratings 121 are located. With the above arrangement, within the regions where adjusting parts of sub-gratings 121 are located, light rays exiting from the adjusting parts of the sub-gratings 121 having different structures all converge towards a predetermined spatial position (e.g., human eyes) located in front of the display device. The aforesaid "sub-gratings 121 having different structures" refers to sub-gratings 121 which enable light rays incident into the sub-gratings 121 to exit at predetermined exit angles.

There are many implementations to enable light rays to be totally reflected in the array substrate 1 except in regions where adjusting parts of sub-gratings 121 are located, and the implementations may vary with structures of sub-gratings 121 included by the grating 12. Exemplarily, when the sub-gratings 121 included by the grating 12 in embodiments of the present disclosure are all diffractive gratings with surfaces being provided with bar-shaped protrusions and bar-shaped grooves, refraction rate n1 of the grating 12 is smaller than refraction rate n of the base substrate 10, and furthermore, incident angle α of light rays emitted from the light source 2 satisfies sin α<1/n, so that the light rays are totally reflected in the array substrate 1 except in regions where adjusting parts of sub-gratings 121 are located. The incident angle α is an angle between the light rays emitted from the light source 2 and a plane where the base substrate 10 is located.

Figure 5:
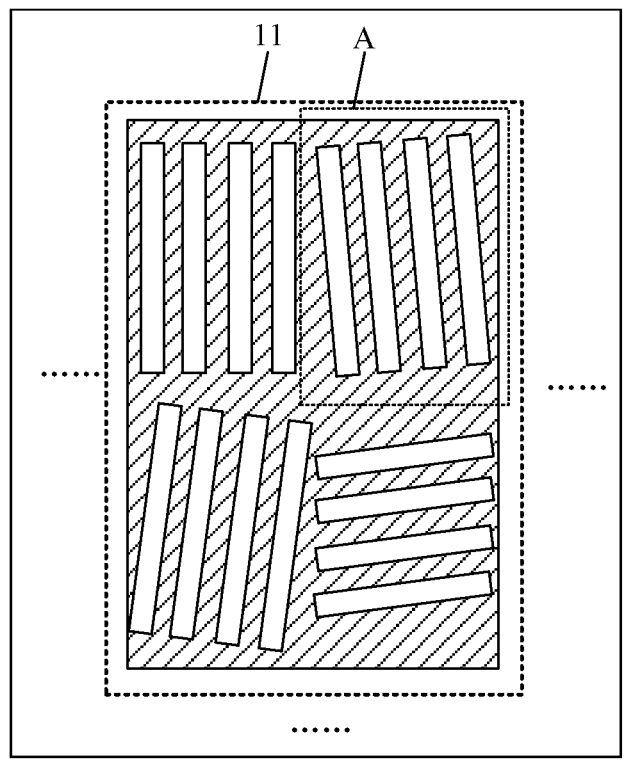
FIG. 5 is a second top view of an array substrate in an embodiment of the present disclosure.
Figure 6:
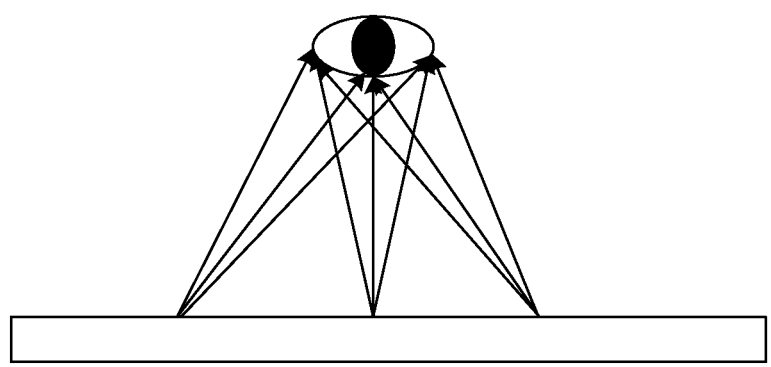
FIG. 6 is a diagram showing propagation paths of light rays emitted from sub-pixels of the array substrate in FIG. 5 in an embodiment of the present disclosure.
Figure 7:
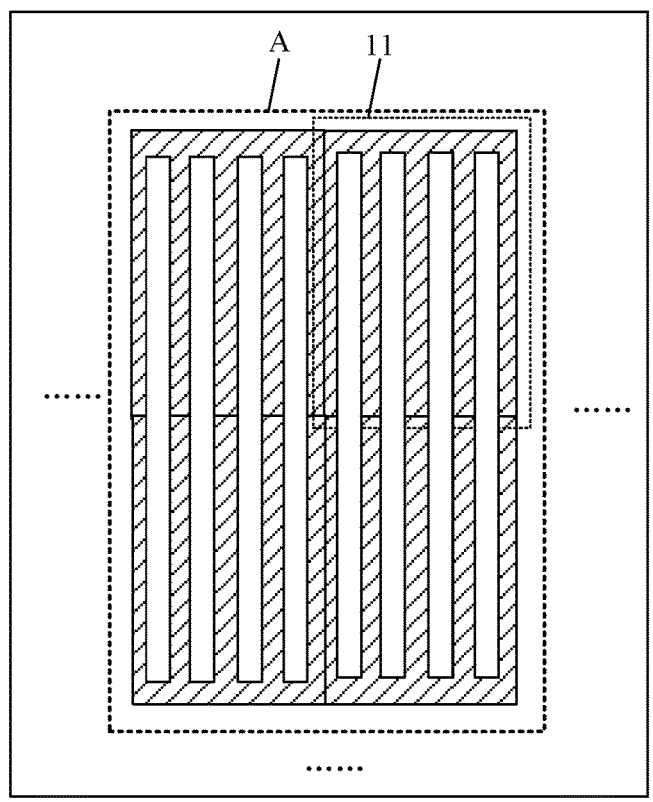
FIG. 7 is a third top view of an array substrate in an embodiment of the present disclosure.

In addition, the array substrate 1 may comprise a plurality of preset areas A in many ways. Accordingly, sub-gratings 121 having different structures may correspond to sub-pixels 11 in many ways. Exemplarily, as shown in FIG. 3, an area where one sub-pixel 11 is located is a preset area A, and one sub-pixel 11 corresponds to a sub-grating 121 with one structure. In this way, light rays emitted from each sub-pixel 11 all propagate in a direction directed to pupils of human eyes after passing through its corresponding sub-grating 121, and then a highest light ray utilization of the display device is achieved. Alternatively, as shown in FIG. 5, an area where one sub-pixel 11 is located comprises a plurality of preset areas A, and an individual sub-pixel 11 corresponds to a plurality of sub-gratings 121 having different structures so that the propagation directions of light rays emitted from individual sub-pixel 11 are slightly different. As such, as shown in FIG. 6, light rays emitted from individual sub-pixels 11 may cover a certain range, for example, covering entire human eyes, to adapt to movement of pupils of human eyes and differences of pupil distances of different users, thereby enabling the display device to be applied more flexibly. Alternatively, as shown in FIG. 7, an area where adjacent multiple sub-pixels 11 are located is a preset area A. At this point, the adjacent multiple sub-pixels 11 located in the same preset area A correspond to sub-gratings 121 with one structure so as to make the fabricating process of the display device simpler while improving the light ray utilization of the display device.

The display device according to embodiments of the present disclosure may have the aforesaid structures. Since sub-gratings 121 having different structures correspond to sub-pixels 11 located in different preset areas A, and light rays exiting from the adjusting parts of the sub-gratings 121 having different structures all converge towards a predetermined spatial position (e.g., human eyes) located in front of the display device, light rays emitted from sub-pixels 11 all converge towards the predetermined spatial position located in front of the display device after passing through respective sub-gratings 121. This effectively increases the amount of light rays emitted from the sub-pixels 11 into a predetermined spatial position (human eyes), thereby effectively improving the light ray utilization of the display device. In addition, in prior art, a backlight module included by the display device is located on a surface of the array substrate facing away from the color film substrate, whereas in the display device according to embodiments of the present invention, as shown in FIG. 2, the light source 2 is located nearby a side of the base substrate 10 included by the array substrate 1. Hence, as compared with the display device in prior art, the display device according to embodiments of the present disclosure is lighter and thinner.

Two embodiments of the present disclosure are provided hereinafter to describe design manners for specific structures of all sub-gratings 121.

Embodiment 1

According to an embodiment of the present disclosure, three design manners for specific structures of all sub-gratings 121 are described with reference to FIG. 3 by way of example, in which an area where one sub-pixel 11 is located is a preset area A, and one sub-pixel 11 corresponds to a sub-grating 121 with one structure.

The first design manner is as shown in FIG. 3. All sub-gratings 121 are slit grating, and adjusting parts of the sub-gratings 121 are slits included in the sub-gratings 121. During use, for example when the display device is applied to virtual reality glasses, as shown in FIG. 4 (where only one slit is shown in the figure by way of example), the sub-pixel 11 located at a center of the array substrate 1 is exactly aligned with human eye, and then light rays exiting from a sub-grating 121 corresponding to that sub-pixel 11 exit in a direction perpendicular to the array substrate 1. Light rays exiting from sub-gratings 121 corresponding to other sub-pixels 11 are all angled relative to the direction perpendicular to the array substrate 1. Hence, a specific structure of the sub-grating 121 corresponding to the sub-pixel 11 located at the center of the array substrate 1 is different form specific structures of other sub-gratings 121 to some extent. For ease of description, in embodiments of the present disclosure, the sub-grating 121 corresponding to the sub-pixel 11 located at the center of the array substrate 1 is defined as first sub-grating 121', and sub-gratings 121 except for the first sub-grating 121' are defined as second sub-grating 121".

First, the specific structure of the first sub-grating 121' is described. As known from the above description, propagation direction of light rays emitted from sub-pixel(s) 11 located at the center of the array substrate 1 should be in a direction perpendicular to the array substrate 1. Hence, as shown in FIG. 4, exit angle $\theta_1$ of light rays exiting from the first sub-grating 121' satisfies $\theta_1 90°$, wherein the exit angle $\theta_1$ is an angle between the light rays exiting from the first sub-grating 121' and a plane where the grating 12 is located.

Specifically, when extension direction of slits included in the first sub-grating 121' is parallel to a side surface of the base substrate 10 that is adjacent to the light source 2 (namely, the light incident surface of the base substrate), grating constant $d_1$ of the first sub-grating 121' should satisfy a diffraction equation of slit grating: $d_1 (\sin \Phi_1 \pm \sin \Psi_1) = k\lambda_1$, wherein $\Phi_1$ is an angle between light rays incident into the first sub-grating 121' and normal of the first sub-grating 121', $\Psi_1$ is angle between light rays exiting from the first sub-grating 121' and the normal of the first sub-grating 121', $\lambda_1$ is wavelength of light rays in a first color, which first color is a color to be displayed by the sub-pixel 11 corresponding to the first sub-grating 121' (for example, when the sub-pixel 11 is used to display red, $\lambda_1$ is infrared wavelength), k is diffraction order, and k=0, 1, 2 . . . . As known from FIG. 4, $\Phi_1=90°-\alpha$, $\Psi_1=90°-\theta_1$, and then $d_1 \cos \alpha = k\lambda_1$ can be obtained by substituting $\theta_1=90°$ and $\cos \theta_1=0$ into the above diffraction equation. Unless otherwise specified, all of the embodiments of the present disclosure take k=1 as an example, and then $$d_1 = \frac{\lambda_1}{\cos \alpha}$$

may be obtained by substituting k=1 into $d_1 \cos \alpha = k\lambda_1$.

Next, the specific structure of the second sub-grating 121" is described.

As known from the above, light rays exiting from the first sub-grating 121' are emitted in a direction perpendicular to the array substrate 1. Base on this, in some embodiments, all second sub-gratings 121" are symmetrically distributed about a center, and the center of symmetry is the center of the array substrate 1. As such, when designing specific structures for all second sub-gratings 121", one need only design specific structures for second sub-gratings 121" distributed in a predetermined direction outwards from the sub-pixel 11 at the center of the array substrate 1. Specific structures of second sub-gratings 121" at other positions on the array substrate 1 may be envisioned by making simple changes (e.g., be rotational symmetry or mirror symmetry) on basis of the specific structures of those sub-gratings 121" in the predetermined direction. This makes the fabricating process of the display device simpler.

Exemplarily, taking the above described predetermined direction, i.e., a direction outwards from the first sub-grating 121' and perpendicularly pointing towards the side surface of the base substrate 10 that is adjacent to the light source 2, as an example, as shown in FIG. 4, the exit angle $\theta_2$ of light rays exiting from a second sub-grating 121" distributed in the predetermined direction satisfies $$\theta_2 = \arctan \frac{D}{L},$$

wherein the exit angle $\theta_2$ is an angle between light rays exiting from the second sub-grating 121" and a plane where the second sub-grating 121" is located, D is a vertical distance between a predetermined spatial position (e.g., human eye) and the plane where the second sub-grating 121" is located, and L is a distance between this second sub-grating 121" and the first sub-grating 121' in the predetermined direction, namely, a distance between the center of the second sub-grating 121" and the center of the first sub-grating 121' in the predetermined direction.

Specifically, grating constant $d_2$ of a second sub-grating 121" should also satisfy the diffraction equation of slit grating: $d_2(\sin \Phi_2 \pm \sin \Psi_2) = k\lambda_2$, wherein $\Phi_2$ is an angle between light rays incident into the second sub-grating 121" and normal of the second sub-grating 121", $\Psi_2$ is an angle between light rays exiting from the second sub-grating 121" and the normal of the second sub-grating 121", $\lambda_2$ is wavelength of light rays in a second color, the second color is a color to be displayed by a sub-pixel 11 corresponding to the second sub-grating 121" (for example, when the sub-pixel

11 is used to display red, $\lambda_2$ is infrared wavelength), k is diffraction order, and k=0, 1, 2 . . . . As known from FIG. 4, $\Phi_2=90°-\alpha$, $\Psi_2=90°-\theta_2$, and then $$d_2 = \frac{\lambda_2}{\cos\alpha \pm \frac{L}{\sqrt{D^2+L^2}}}$$

can be obtained by substituting $$\cos\theta_2 = \frac{L}{\sqrt{D^2+L^2}}$$

and k=1 into the above diffraction equation, wherein the above equation takes a plus sign when the light rays incident into the second sub-grating 121" and the light rays exiting from the second sub-grating 121" are on the same side of the normal of the second sub-grating 121"; and the above equation takes a minus sign when the light rays incident into the second sub-grating 121" and the light rays exiting from the second sub-grating 121" are on different sides of the normal of the second sub-grating 121".

Figure 8:
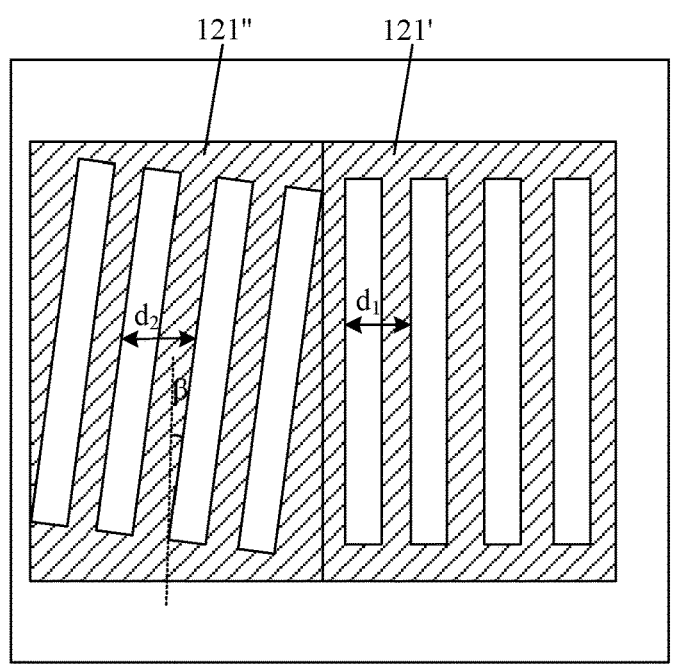
FIG. 8 is a fourth top view of an array substrate in an embodiment of the present disclosure.

To reduce design difficulty for second sub-gratings 121", in some embodiments, the valid number and width of slits included in second sub-gratings 121" distributed in the predetermined direction are the same as the first sub-grating 121'. At this time, one just simply make slits included in a second sub-grating 121" form an inclination angle $\beta$, which inclination angle $\beta$ is an angle between extension direction of the slits in the second sub-grating 121" and the side surface of the base substrate 10 that is adjacent to the light source 2, that is to say, forming an angle $\beta$ between the extension direction of the slits included in the second sub-grating 121" and the extension direction of slits included in the first sub-grating 121'. As shown in FIG. 8, when the inclination angle $\beta$ satisfies $$\cos\beta = \frac{d_1}{d_2},$$

the grating constant $d_2$ of the second sub-gratings 121" would satisfy the above condition. As known from the above, $$d_1 = \frac{\lambda_1}{\cos\alpha}, \text{ and}$$

$$d_2 = \frac{\lambda_2}{\cos\alpha \pm \frac{L}{\sqrt{D^2+L^2}}}.$$

Accordingly, $$\cos\beta = \frac{d_1}{d_2} = \frac{\frac{\lambda_1}{\cos\alpha}}{\frac{\lambda_2}{\cos\alpha \pm \frac{L}{\sqrt{D^2+L^2}}}} = \frac{\lambda_1\left(\cos\alpha \pm \frac{L}{\sqrt{D^2+L^2}}\right)}{\lambda_2 \cos\alpha},$$

and then $$\beta = \arccos\frac{\lambda_1\left(\cos\alpha \pm \frac{L}{\sqrt{D^2+L^2}}\right)}{\lambda_2 \cos\alpha}$$

could be obtained by calculation. Definitions of parameters in the above equations are the same as those mentioned above, and then will not be discussed in details herein.

In addition, since sub-pixels 11 arranged on the array substrate 1 generally include sub-pixels 11 for displaying red, sub-pixels 11 for displaying green and sub-pixels 11 for displaying blue, embodiments of the present disclosure further provide a manner for adjusting intensity of light rays exiting from sub-gratings 121 so that light intensities of light rays emitted from those sub-pixels 12 are consistent, thereby blending light rays emitted from sub-pixels 11 into uniform white light. This facilitates to increase uniformity of displayed images and make colors of the display images seem true.

Exemplarily, the light intensity formula of slit grating is $$I = I_0 \frac{\sin^2\delta}{\delta^2} \cdot \frac{\sin^2 N \cdot v}{\sin^2 v},$$

wherein $$\delta = \frac{\pi a \sin\theta}{\lambda}, \text{ and } v = \frac{\pi d \sin\theta}{\lambda}.$$

When a sub-grating 121 is a first sub-grating 121', $\lambda$ is the above $\lambda_1$; and when a sub-grating 121 is a second sub-grating 121", $\lambda$ is the above $\lambda_2$. $\alpha$ is width of slits included in the sub-grating 121, d is grating constant of the sub-grating 121, N is the valid number of slits included in the sub-gratings 121, $\theta$ is exit angle of the light rays exiting from the sub-grating 121, namely, an angle between the light rays exiting from the sub-grating 121 and a plane where the sub-grating 121 is located. Similarly, when the sub-grating 121 is the first sub-grating 121', $\theta$ is the above $\theta_1$; and when the sub-grating 121 is the second sub-grating 121", $\theta$ is the above $\theta_2$. $I_0$ is intensity of light rays incident into the sub-grating 121 and having wavelength $\lambda$. Similarly, when the sub-grating 121 is the first sub-grating 121', $\lambda$ corresponds to the first color; and when the sub-grating 121 is the second sub-grating 121", $\lambda$ corresponds to the second color. Therefore, in embodiments of the present disclosure, intensity of the light rays exiting from the sub-grating 121 may be adjusted in such a way as adjusting the width $\alpha$ of the slits included in the sub-grating 121, the grating constant d of the sub-grating 121, and the valid number N of the slits included in the sub-grating 121. Those skilled in the art can envision specific manner for adjusting light intensity through the above parameters in relation to the above equations, which will not be discussed in details herein. Certainly, manners for adjusting intensity of light rays exiting from the sub-gratings 121 are not limited to the above, and furthermore, advantageous effects resulting from adjustment of intensity of light rays are not limited to the above.

As known from the first design manner, the specific structure of the sub-grating(s) 121 corresponding to the sub-pixel(s) 11 located at the center of the array substrate 1 is different from the specific structures of other sub-gratings 121 to some extent. Hence, for ease of description, in a second design manner, the sub-grating(s) 121 corresponding to the sub-pixel 11 located at the center of the array substrate 1 is also defined as first sub-grating 121', and sub-gratings 121 except for the first sub-grating 121' are also defined as second sub-grating 121".

Figure 9:
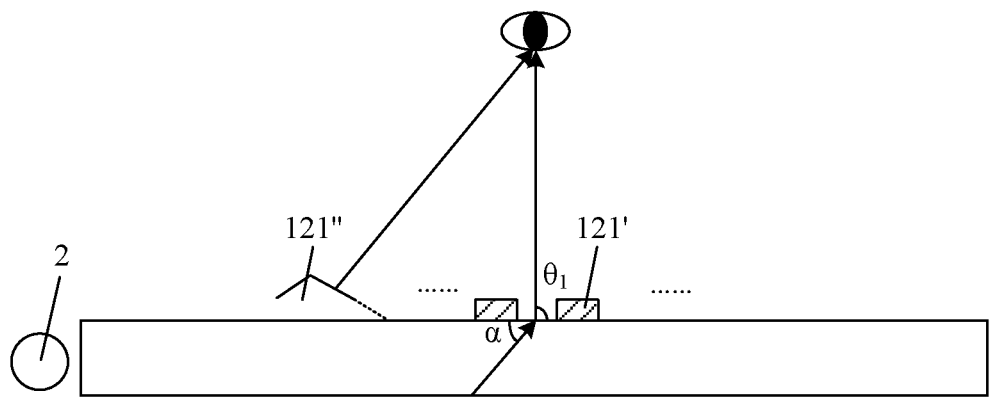
FIG. 9 is a second sectional view of an array substrate in an embodiment of the present disclosure.

In the second design manner, as shown in FIG. 9, the first sub-grating 121' is slit grating, and the adjusting part of the first sub-grating 121' is slits included in the first sub-grating' 121. All second sub-gratings 121" are blazed grating. The blazed grating includes a grating surface and a groove surface. The adjusting part of an individual second sub-grating 121" is the groove surface of the second sub-grating 121".

Specifically, when extension direction of slits included in the first sub-grating 121' is parallel to a side surface of the base substrate 10 that is adjacent to the light source 2, grating constant $d_1$ of the first sub-grating 121' should satisfy a diffraction equation of slit grating: $d_1(\sin \Phi_1 \pm \sin \Psi_1)=k\lambda_1$, wherein $\Phi_1$ is an angle between light rays incident into the first sub-grating 121' and normal of the first sub-grating 121', $\Psi_1$ is an angle between the light rays exiting from the first sub-grating 121' and the normal of the first sub-grating 121', $\lambda_1$ is wavelength of light rays in a first color, the first color is a color to be displayed by the sub-pixel 11 corresponding to the first sub-grating 121' (for example, when that sub-pixel 11 is used to display red, $\lambda_1$ is infrared wavelength), k is diffraction order, and k=0, 1, 2 . . . . As known from FIG. 4, $\Phi_1=90°-\alpha$, $\Psi_1=90°-\theta_1$, and then $d_1 \cos \alpha=k\lambda_1$ can be obtained by substituting $\theta_1=90°$, $\cos \theta_1=0$, and k=1 into the above diffraction equation, and accordingly, $$d_1 = \frac{\lambda_1}{\cos\alpha}$$

is obtained.

Similar to the first design manner, in some embodiments, all second sub-gratings 121" are symmetrically distributed about a center, and the center of symmetry is a center of the array substrate 1. Advantageous effects of this manner can be found from relevant description of the first design manner, and will not be discussed in details herein.

Figure 10:
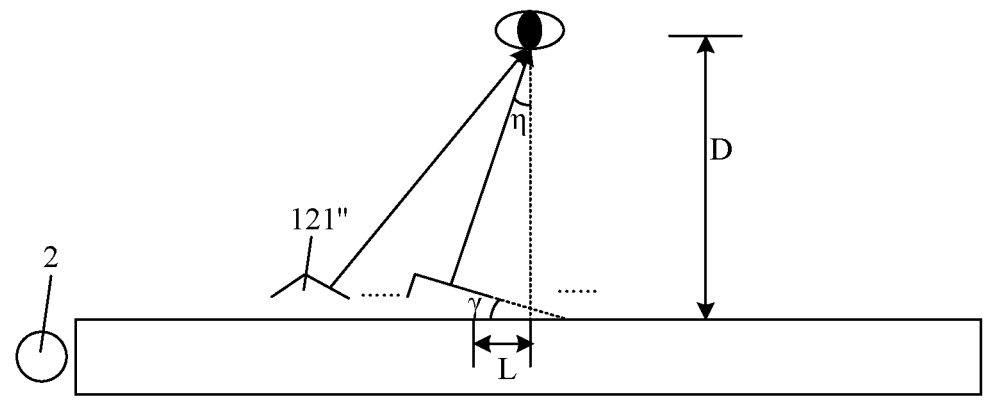
FIG. 10 is a third sectional view of an array substrate in an embodiment of the present disclosure.

Exemplarily, taking the above described predetermined direction, i.e., a direction outwards from the first sub-grating 121' and perpendicularly pointing towards the side surface of the base substrate 10 that is adjacent to the light source 2, as an example, and blazing angle of a second sub-grating 121" distributed in the predetermined direction is γ, as shown in FIG. 10, the blazing angle γ is equal to an angle η between light rays exiting from the second sub-grating 121" and the direction perpendicular to the array substrate 1. Since $$\eta = \arctan\frac{L}{D}, \gamma = \arctan\frac{L}{D}.$$

Grating constant of the second sub-grating 121" distributed in the predetermined direction is $d_2$, and $$d_2 = \frac{\lambda_2\sqrt{L^2+D^2}}{2L}$$

can be obtained from the diffraction equation of blazed grating $2d_2 \sin \gamma=\lambda_2$ and $$\sin\gamma = \frac{L}{\sqrt{L^2+D^2}},$$

wherein $\lambda_2$ is wavelength of light rays in a second color, the second color is a color to be displayed by the sub-pixel 11 corresponding to that second sub-grating 121", D is a vertical distance between a predetermined spatial position (e.g., human eyes) and a plane where the second sub-grating 121" is located, and L is a distance between the second sub-grating 121" and the first sub-grating 121' in the predetermined direction, namely, a distance between the center of that second sub-grating 121" and the center of the first sub-grating 121' in the predetermined direction.

In addition, in the second design manner, intensity of light rays exiting from an individual sub-grating 121 may be adjusted, and the adjusting manner and advantageous effects are all similar to the first design manner, and will not be discussed in details herein.

Figure 11:
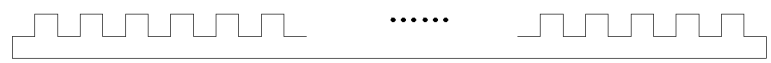
FIG. 11 is a sectional view of a diffractive grating with a surface being provided with bar-shaped protrusions and bar-shaped grooves in an embodiment of the present disclosure.

In the third design manner, all sub-gratings 121 are diffractive grating with a surface being provided with bar-shaped protrusions and bar-shaped grooves, as shown in FIG. 11. At this time, exit angle and intensity of light rays exiting from the sub-gratings 121 are both related to the inclination angle and width of the bar-shaped protrusions or bar-shaped grooves, which may be obtained by those skilled in the art by referring to the relevant relationships in the first design manner, and will not be discussed in details herein.

Embodiment 2

According to an embodiment of the present disclosure, a specific design manner for all sub-gratings 121 is described with reference to FIG. 5 by way of example, in which an area where one sub-pixel 11 is located comprises a plurality of preset areas A, and an individual sub-pixel 11 corresponds to a plurality of sub-gratings 121 having different structures.

Optionally, as shown in FIG. 5, the plurality of sub-gratings 121 corresponding to an individual sub-pixel 11 and having different structures are all slit grating, and the valid number and width of slits included in respective sub-gratings 121 are the same. The slits included in respective sub-gratings 121 having different structures have different inclination angles β so that light rays exiting from the plurality of sub-gratings 121 corresponding to an individual sub-pixel 11 and having different structures cover entire human eyes, wherein inclination angles β are angles between extension directions of slits in respective sub-gratings 121 and the side surface of the base substrate 10 that is adjacent to the light source 2.

Exemplarily, the design manner for arranging a plurality of sub-gratings 121 to correspond to an individual sub-pixel 11 is as follows. One of the plurality of sub-gratings 121 corresponding to the individual sub-pixel 11 is designed in the same manner as Embodiment 1, and the other ones of the plurality of sub-gratings 121 corresponding to the individual sub-pixel 11 may be obtained by increasing or reducing their inclination angles of slits in a certain range on basis of the duly-designed sub-grating 121. In conjunction with the distance between human eyes and the display device during use of the display device, the length of human eyes and the content of Embodiment 1, those skilled in the art may obtain a maximum difference between inclination angles β of slits included in the plurality of sub-gratings 121 corresponding to the individual sub-pixel 11 and having different structures, so that the light rays emitted from the sub-pixels 11 can cover human eyes while not causing substantial reduction of light ray utilization. Exemplarily, when the display device is applied to virtual reality glasses, the distance between human eyes and the display device is generally 5 cm, and the length of human eyes is generally 3.5 cm. Hence, the maximum difference between inclination angles β of slits included in the plurality of sub-gratings 121 corresponding to an individual sub-pixel 11 and having different structures is 30°-40°, so that the light rays emitted from the sub-pixel 11 can cover human eyes while not causing substantial reduction of light ray utilization.

Optionally, the plurality of sub-gratings 121 included by an individual sub-pixel 11 may also be blazed grating, and the sub-gratings 121 included by an individual sub-pixel 11 have same grating constants d and different blazing angles γ. Similarly, in conjunction with the distance between human eyes and the display device, the length of human eyes and the content of Embodiment 1, those skilled in the art may obtain a maximum difference between blazing angles γ of the plurality of sub-gratings 121 included by an individual sub-pixel 11.

It should be noted that in embodiment as shown in FIG. 7, an area where a plurality of sub-pixels 11 are located is a preset area A. When adjacent multiple sub-pixels 11 located in the same preset area A correspond to sub-gratings 121 with one structure, a specific design manner for all sub-gratings 121 may be conceived by those skilled in the art by referring to description in Embodiment 1 and will not be discussed in details herein.

In addition, as shown in FIG. 2, the display device in an embodiment of the present disclosure further comprises a color film substrate 3 disposed opposite to the array substrate 1, and a liquid crystal molecularly layer 4 disposed between the array substrate 1 and the color film substrate 3. When light rays emitted from the light source 2 are linearly polarized light, the display device may display normally by disposing an upper polarizer 31 on only a side of the color film substrate 3 facing away from the array substrate 1. When light rays emitted from the light source 2 are natural light, in addition to the upper polarizer 31 disposed on the side of the color film substrate 3 facing away from the array substrate 1, the display device further comprises a lower polarizer 13 which is disposed between the light source 3 and the base substrate 10 of the array substrate 1, or disposed on the grating 12. Exemplarily, the upper polarizer 31 and lower polarizer 13 are Wire Grid Polarizes (WGP).

In addition, embodiments of the present disclosure further provide virtual reality glasses. The virtual reality glasses comprise housing and two aforesaid display devices located in the housing, wherein the predetermined spatial position of one of the display devices corresponds to a user's left eye, and the predetermined spatial position of the other of the display devices corresponds to the user's right eye. Since the virtual reality glasses provided according to embodiments of the present disclosure comprises the aforesaid display devices, the virtual reality glasses could achieve the same advantageous effects as the aforesaid display devices, which will not be discussed in details herein.

What are described are specific implementations of the present disclosure. However, the protection scope of the present disclosure is not limited thereto. Variations or substitutions that may be readily envisaged by those skilled in the art within the technical scope disclosed by the present disclosure all fall within the protection scope of the present disclosure. Hence, the protection scope of the present disclosure should be subject to the protection scope defined by the appended claims.

LIST OF REFERENCE NUMBERS

1—array substrate;
2—light source;
3—color film substrate;
4—liquid crystal molecular layer.
10—base substrate;
11—sub-pixel;
12—grating;
13—lower polarizer;
31—upper polarizer;
121—sub-grating;
121'—first sub-grating;
121"—second sub-grating;

The invention claimed is:
1. A display device, comprising:
an array substrate comprising a base substrate, a plurality of sub-pixels arranged on the base substrate, and a grating arranged on the base substrate, the grating comprising a plurality of sub-gratings having different structures, each sub-grating comprising an adjusting part for adjusting propagation direction of light rays, and light rays exiting from the adjusting part converging to a predetermined spatial position; the array substrate further comprising a plurality of preset areas, and the plurality of sub-gratings respectively corresponding to sub-pixels located in different preset areas; and
a light source disposed beside the base substrate, light rays emitted from the light source being parallel light, and the light rays being totally reflected in the array substrate except in regions where adjusting parts of sub-gratings are located;
wherein an area where one sub-pixel is located is a preset area and one sub-pixel corresponds to a sub-grating or sub-gratings with one structure;
wherein incident angle of light rays incident into all of the sub-gratings is α, and α is an angle between the light rays emitted from the light source and a plane where the base substrate is located; the sub-gratings comprise first sub-grating(s) corresponding to sub-pixel(s) located on a center of the array substrate, the first sub-grating is slit grating, and the adjusting part of the first sub-grating is slits included in the first sub-grating; and
wherein extension direction of slits included in the first sub-grating is parallel to a side surface of the base substrate that is adjacent to the light source, grating constant of the first sub-grating is $d_1$,

$$d_1 = \frac{\lambda_1}{\cos\alpha},$$

wherein $\lambda_1$ is wavelength of light rays in a first color, and the first color is a color to be displayed by the sub-pixel(s) corresponding to the first sub-grating.

2. The display device according to claim 1, wherein all of the sub-gratings are slit grating, and the adjusting parts of the sub-gratings are slits included in the sub-gratings.

3. The display device according to claim 2, wherein the sub-gratings further comprise second sub-gratings corresponding to other sub-pixels; exit angle of light rays exiting from the first sub-grating is $\theta_1$, and the exit angle $\theta_1$ is an angle between the light rays exiting from the first sub-grating and a plane where the grating is located, and $\theta_1=90°$.

4. The display device according to claim 3, wherein all of the second sub-gratings are symmetrically distributed about a center, and the center of symmetry is the center of the array substrate.

5. The display device according to claim 4, wherein a direction outwards from the first sub-grating and perpendicularly pointing towards the side surface of the base substrate that is adjacent to the light source is a predetermined direction, and exit angle of light rays exiting from a second sub-grating distributed in the predetermined direction is $\theta_2$, $$\theta_2 = \arctan\frac{D}{L},$$

wherein D is a vertical distance between the predetermined spatial position and the plane where the second sub-grating is located, and L is a distance between the second sub-grating and the first sub-grating in the predetermined direction.

6. The display device according to claim 5, wherein grating constant of the second sub-grating is $d_2$, $$d_2 = \frac{\lambda_2}{\cos\alpha \pm \frac{L}{\sqrt{D^2+L^2}}},$$

wherein $\lambda_2$ is wavelength of light rays in a second color, and the second color is a color to be displayed by the sub-pixel corresponding to the second sub-grating; the above equation takes a plus sign if the light rays incident into the second sub-grating and the light rays exiting from the second sub-grating are located on the same side of the second sub-grating, and the above equation takes a minus sign if the light rays incident into the second sub-grating and the light rays exiting from the second sub-grating are located on different sides of the second sub-grating.

7. The display device according to claim 6, wherein the valid number and width of slits included in respective second sub-gratings distributed in the predetermined direction are the same as the first sub-grating, and the slits included in respective second sub-gratings have an inclination angle $\beta$, and $$\beta = \arccos\frac{\lambda_1\left(\cos\alpha \pm \frac{L}{\sqrt{D^2+L^2}}\right)}{\lambda_2\cos\alpha}.$$

8. The display device according to claim 2, wherein light intensity of light rays exiting from a sub-grating is I, $$I = I_0\frac{\sin^2\delta}{\delta^2}\cdot\frac{\sin^2 N\cdot v}{\sin^2 v},$$

wherein $$\delta = \frac{\pi a\sin\theta}{\lambda} \text{ and } v = \frac{\pi d\sin\theta}{\lambda},$$

here $\lambda$ is wavelength of a color displayed by a sub-pixel corresponding to the sub-grating, a is width of slits included in the sub-grating, d is grating constant of the sub-grating, N is the valid number of slits included in the sub-grating, $\theta$ is exit angle of the light rays exiting from the sub-grating, and $I_0$ is intensity of light rays incident into the sub-grating and having wavelength $\lambda$.

9. The display device according to claim 1, wherein the sub-gratings further comprise second sub-gratings corresponding to other sub-pixels; all of the second sub-gratings are blazed grating, and the adjusting parts of the second sub-gratings are respectively groove surfaces of the second sub-gratings.

10. The display device according to claim 9, wherein a direction outwards from the first sub-grating and perpendicularly pointing towards the side surface of the base substrate that is adjacent to the light source is a predetermined direction, blazing angle of a second sub-grating distributed in the predetermined direction is $\gamma$, $$\lambda = \arctan\frac{L}{D},$$

and grating constant of the second sub-grating distributed in the predetermined direction is $d_2$, $$d_2 = \frac{\lambda_2\sqrt{L^2+D^2}}{2L},$$

wherein $\lambda_2$ is wavelength of light rays in a second color, the second color is a color to be displayed by a sub-pixel corresponding to the second sub-grating, D is a vertical distance between the predetermined spatial position and the plane where the grating is located, and L is a distance between the second sub-grating and the first sub-grating in the predetermined direction.

11. The display device according to claim 1, wherein all of the sub-gratings are diffractive gratings with surfaces being provided with bar-shaped protrusions and bar-shaped grooves.

12. The display device according to claim 1, further comprises a color film substrate arranged opposite to the array substrate, and a liquid crystal molecularly layer arranged between the array substrate and the color film substrate, the light rays emitted from the light source are linearly polarized light, and only a side of the color film substrate facing away from the array substrate is provided with an upper polarizer; or, the light rays emitted from the light source is natural light, and in addition to the upper polarizer provided on the side of the color film substrate facing away from the array substrate, the display device further comprises a lower polarizer which is arranged between the light source and the side surface of the base substrate or arranged on the grating.

13. Virtual reality glasses, comprising housing, wherein the virtual reality glasses further comprise two display devices according to claim 1 being located in the housing, wherein the predetermined spatial position of one of the display devices corresponds to a user's left eye, and the predetermined spatial position of the other of the display devices corresponds to the user's right eye.

14. A display device, comprising:
an array substrate comprising a base substrate, a plurality of sub-pixels arranged on the base substrate, and a grating arranged on the base substrate, the grating comprising a plurality of sub-gratings having different structures, each sub-grating comprising an adjusting part for adjusting propagation direction of light rays, and light rays exiting from the adjusting part converging to a predetermined spatial position; the array substrate further comprising a plurality of preset areas, and the plurality of sub-gratings respectively corresponding to sub-pixels located in different preset areas; and a light source disposed beside the base substrate, light rays emitted from the light source being-parallel light, and the light rays being totally reflected in the array substrate except in regions where adjusting parts of sub-gratings are located;

wherein an area where one sub-pixel is located comprises a plurality of preset areas, and an individual sub-pixel corresponds to a plurality of sub-gratings having different structures so that light rays exiting from the plurality of sub-gratings having different structures and corresponding to the individual pixel cover a certain range;

wherein the plurality of sub-gratings having different structures and corresponding to the individual pixel are all slit grating, the valid number and width of slits included in respective sub-gratings are the same, and the slits included in the sub-gratings having different structures have different inclination angles β, wherein the inclination angles β are angles between extension directions of slits in respective sub-gratings and the side surface of the base substrate that is adjacent to the light source.

15. The display device according to claim 14, wherein a maximum difference between inclination angles β of the slits included in the plurality of sub-gratings having different structures and corresponding to an individual sub-pixel is 30°-40°.

16. Virtual reality glasses, comprising housing, wherein the virtual reality glasses further comprise two display devices according to claim 14 being located in the housing, wherein the predetermined spatial position of one of the display devices corresponds to a user's left eye, and the predetermined spatial position of the other of the display devices corresponds to the user's right eye.

17. A display device, comprising:
an array substrate comprising a base substrate, a plurality of sub-pixels arranged on the base substrate, and a grating arranged on the base substrate, the grating comprising a plurality of sub-gratings having different structures, each sub-grating comprising an adjusting part for adjusting propagation direction of light rays, and light rays exiting from the adjusting part converging to a predetermined spatial position; the array substrate further comprising a plurality of preset areas, and the plurality of sub-gratings respectively corresponding to sub-pixels located in different preset areas; and a light source disposed beside the base substrate, light rays emitted from the light source being parallel light, and the light rays being totally reflected in the array substrate except in regions where adjusting parts of sub-gratings are located;

wherein an area where adjacent multiple sub-pixels are located is a preset area, and the adjacent multiple sub-pixels located in the same preset area correspond to sub-grating(s) with one structure;

wherein incident angle of light rays incident into all of the sub-gratings is α, and α is an angle between the light rays emitted from the light source and a plane where the base substrate is located; the sub-gratings comprise first sub-grating(s) corresponding to sub-pixel(s) located on a center of the array substrate, the first sub-grating is slit orating, and the adjusting part of the first sub-grating is slits included in the first sub-grating; and wherein extension direction of slits included in the first sub-grating is parallel to a side surface of the base substrate that is adjacent to the light source, grating constant of the first sub-grating is $d_1$, $$d_1 = \frac{\lambda_1}{\cos\alpha},$$

wherein $\lambda_1$ is wavelength of light rays in a first color, and the first color is a color to be displayed by h sub-pixel(s) corresponding to the first sub-grating.

18. Virtual reality glasses, comprising housing, wherein the virtual reality glasses further comprise two display devices according to claim 17 being located in the housing, wherein the predetermined spatial position of one of the display devices corresponds to a user's left eye, and the predetermined spatial position of the other of the display devices corresponds to the user's right eye.

* * * * *